Figure 1:
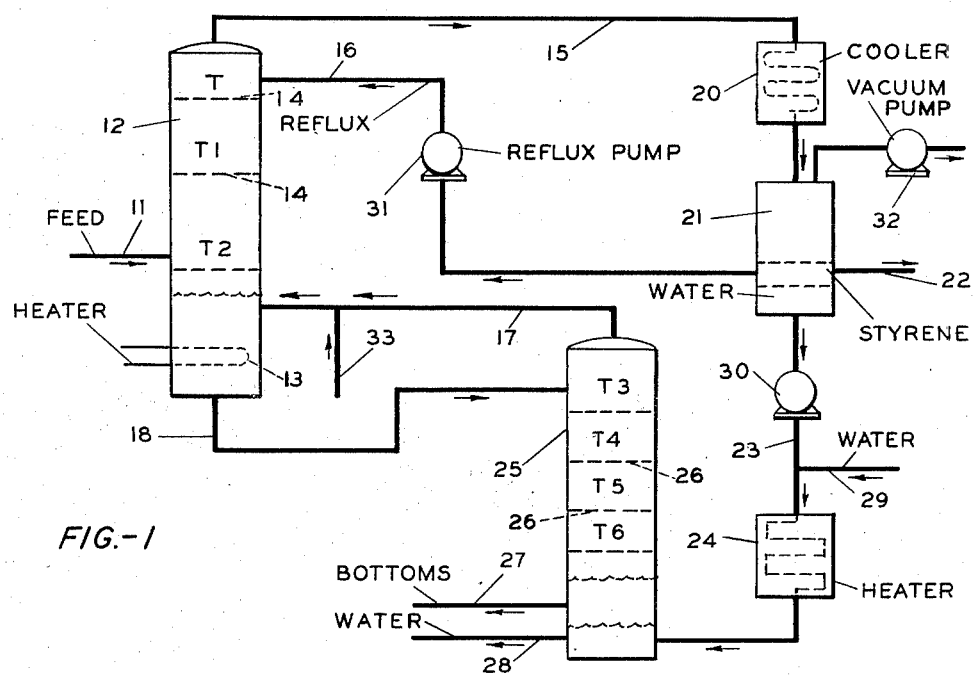

June 5, 1951 D. S. SHERWIN 2,555,939
DISTILLATION OF STYRENE FROM POLYMERS
Filed Nov. 3, 1944

INVENTOR
D. S. SHERWIN
BY Hudson & Young
ATTORNEYS

Patented June 5, 1951

2,555,939

UNITED STATES PATENT OFFICE 2,555,939

DISTILLATION OF STYRENE FROM POLYMERS

Douglas S. Sherwin, Borger, Tex., assignor to Phillips Petroleum Company, a corporation of Delaware Application November 3, 1944, Serial No. 561,805

6 Claims. (Cl. 202—47)

This invention relates to a distillation apparatus and process. In one of its more specific aspects it relates to a distillation apparatus and process for the separation of high boiling material from lower boiling material at temperatures considerably below normal boiling temperatures of the components, in a still more specific application, my invention has special utility for the separation of styrene from styrene polymer wherein the maximum distillation temperature must be maintained at a low value in order to prevent loss of styrene by polymerization.

The fractionation of certain components frequently must be carried out at temperatures below their normal boiling points for reasons well known to chemists. For example, many chemical compounds decompose at temperatures below their normal boiling points, or a chemical composition or a component thereof may become chemically active and react with itself or other components of the composition or even may react with the container.

Two general methods exist for effecting distillations at temperatures below the normal boiling points of the materials to be distilled, one being vacuum distillation and the second being commonly termed "steam" distillation. The former may be utilized with or without the addition of steam.

I have found that the first general method, that is, vacuum distillation in itself is not applicable to the separation of styrene from its polymer because the pressure of the vapor in equilibrium with the kettle product stream at say, 160° F., is so low in case of high polymer concentration, that the actual pressure drop from the base of the fractionation column to the overhead condenser is greater than the allowable pressure drop. The second method, that is, conventional steam distillation with the use of vacuum, is one which can be made to work but this method normally requires an excessively large amount of steam.

One of the points of consideration in the solution of such a problem is that due to the accelerating affect of temperature on the polymerization of styrene, the removal of polymer must be effected at as low a temperature as possible. The polymerization of styrene, even in the presence of polymer already formed, is almost negligible at 160° F. Therefore I have selected this temperature (160° F.) as my maximum operating temperature in an effort to minimize styrene polymerization and subsequent loss. It is a safe temperature and one suitable for comparison with temperatures of the conventional methods. However, it is, of course, possible to raise this temperature to 176° F. or higher with a resulting increase in undesired polymer formation; and still derive value from the invention.

It is to be unerstood that my invention applies to the separation of a component from high boiling constituents in any multicomponent system and that any compositions, pressures, or temperatures mentioned in the following disclosure are not intended as limiting the scope of my invention. Likewise, the principles of my method are equally applicable to all partial pressure distillations, and are not limited to those employing water as the immiscible liquid phase.

An object of my invention is to furnish a process for the separation of higher boiling material from lower boiling material at temperatures below the normal boiling points of the materials being separated. Either the higher boiling or lower boiling material may be the principal product and the other material may be the secondary product.

Another object is to provide novel apparatus for efficiently carrying out said process.

One object when distilling a polymer containing fluid is to place the heating element at a point where the polymer concentration is lower than elsewhere in the system, and at a point of lower concentration than is possible in the apparatus of the prior art, thereby decreasing auto-catalytic or other polymerization.

Another object of my invention is to furnish an economical process for the separation of higher boiling material from lower boiling material at temperatures below the normal boiling points of the components separated, and a process economical of steam.

Still another object of my invention is to furnish a process for the separation of such a reactive material as styrene from its high boiling reaction product (styrene polymer) at a temperature sufficiently low as to minimize the polymerization and subsequent loss of styrene under treatment.

Figure 2:
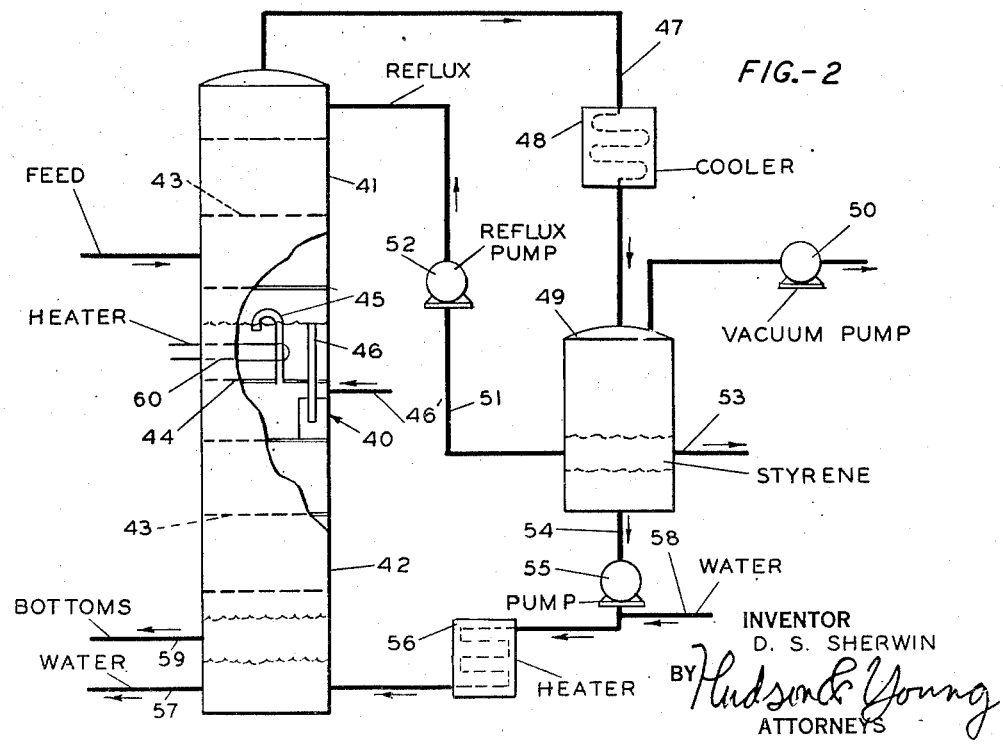

Still other objects and advantages will be apparent to those skilled in the art from a careful study of the following detailed disclosure, in which Figure 1 shows diagrammatically one form of apparatus in which my invention may be practiced, and Figure 2 shows another diagrammatic form of apparatus in which the process of my invention may be practiced.

The principles underlying my invention and the advantages to be gained from its use can best be realized by the following illustration. A multicomponent stream containing largely styrene for example, and from 5-10 mol per cent styrene polymer or other heavy material is to be purified to a product containing not substantially more than about 0.3 mol per cent polymer with a kettle-product loss of styrene and other desirable constituents not to exceed about 0.3 mol per cent of the desirables contained in the feed. The highest temperature which may be tolerated in a styrene system, such as that herein disclosed, is about 160° F.

A feed stock, such as a hydrocarbon stock containing mainly styrene with, for example, 5-10 mol per cent styrene polymer, enters the system shown diagrammatically in Figure 1 by way of a feed line 11. From line 11 the stock enters a vessel 12 which is a vacuum type fractionator containing a reboiler section and heating unit 13. Trays 14 are those normally used in conjunction with vacuum distillation operations. A line 15 carries overhead vapors by way of a vacuum pump 32, to a condenser 20 wherein the said vapors are condensed.

Theoretically, no vacuum pump is necessary in this example of styrene separation because of the low vapor pressure exerted by the styrene overhead product at ordinary cooling water temperatures. However, the practical necessity for removing non-condensible gases which may enter the system requires the use of some gas scavenging means. While 32 is shown as a vacuum pump, any means such as a steam ejector or other scavenging or aspirating means is of course suitable for use as pump 32. The function is to remove non-condensibles and thereby maintain the desired degree of partial vacuum.

Condensate accumulates in accumulator 21, and sufficient styrene for refluxing purposes is cycled through a refluxer line 16 to fractionator 12, the remainder being passed to product storage, not shown, through a line 22. Condensed steam or water accumulates as a lower layer in accumulator 21 from which it passes by way of a pump 30 and a line 23, through a steam generator 24 and thence into the lower portion of a stripping vessel 25. This vessel may contain the type of trays or contact apparatus normally used with vacuum strippers, and these trays 26 may or may not be similar to those of the fractionator 12, mentioned above. Bottoms material is removed by a line 27, and condensed steam or water by a line 28. Water for makeup steam may be added through a line 29 or 33.

While I prefer to use water for steam in some instances other liquids are suitable provided they are non-reactive and substantially insoluble. The word steam in the claims is therefore defined to mean a vapor of any suitable entraining material which is non-reactive throughout and substantially insoluble to all the materials it comes in contact with.

The operation of my process as carried out in the apparatus illustrated in the embodiment of Figure 1 may be as follows, wherein a stream of commercial styrene containing approximately 7 mol per cent high boiling styrene polymer may be efficiently treated for removal of this polymeric material at a temperature not exceeding about 160° F. By maintaining the operating temperature at this value or lower, additional polymer is not formed to any substantial degree, since styrene generally self-polymerizes only very slowly at temperatures below 160° F. depending on the concentration of styrene, polymer and other factors, such as presence of foreign matter.

The stream of styrene to be purified is passed by way of feed line 11 into fractionator 12. The bottom or reboiler section of the fractionator is maintained at a temperature of about 156° F. by addition of heat from the heating element 13. A vacuum pump or other ejector 32 maintains a relatively high vacuum on the entire system, and it should be stated here that all pressures given are in terms of pounds per square inch absolute. Thus, corresponding to the said temperature of 156° F., the absolute pressure in the bottom of the fractionator is approximately 2.4 pounds per square inch. Reboiling by the heating element 13 causes sufficient evaporation of styrene to increase the concentration of styrene polymer in the bottoms to about 20 mol per cent. Liquid on the top tray is at a pressure of about 2.1 pounds and at a temperature of about 145° F. In this fractionator I have shown only three trays and the feed entering on top of the bottom tray. This number of trays, and the feed line position were selected for purposes of illustration only, and the actual number of trays necessary and the feed line position are best determined separately for each installation.

Fractionator overhead vapors contain approximately 46.77 mols styrene, 70 mols steam and 0.13 mol styrene polymer, top tray conditions being about 145° F. and 2.1 pounds absolute pressure. These overhead vapors are cooled in cooler or condenser 20, the condensate and uncondensed vapors passing on to the accumulator 21. Condensed steam or water settle in the accumulator as a bottom layer and upon this is the styrene condensate layer. A portion of this styrene condensate sufficient to cool properly the top of the fractionator is refluxed to the tower through reflux line 16, the remainder of the styrene passing through line 22 to storage, not shown, or other disposal as desired, as product of the process.

Water from the bottom of the accumulator 21 is withdrawn through line 23 by pump 30, additional water added, if necessary, through line 29, and converted to steam in heater or steam generator 24. This steam then passes into the bottom portion of stripper section 25. Since no feed stock as such, nor liquid reflux enter this section 25, it then serves wholly as a stripper. The bottoms from the fractionator kettle pass by way of line 18 to the top tray of the stripper, and same on passing downward therein becomes increasingly richer in styrene polymer through loss of styrene by evaporation into the ascending current of stripper steam. Styrene vapors and steam leave the stripper and pass into the bottom or kettle section of the fractionator. This steam and styrene vapor mixture leaves the stripper 25 at about 128° F., and is heated in said kettle section to about 156° F., at which temperature large amounts of styrene are evaporated and pass up the fractionator tower. Entrained or vaporized styrene polymer is condensed and combines with new polymer brought in with the continuously added feed stock to give a polymer concentration of about 20% in the kettle of 12. Stripped polymer, withdrawn through line 27 to disposal as desired, contains slightly less than 4 mol percent styrene.

Water withdrawn from the stripper through line 28 may be sent to waste or it may serve as the makeup water added by line 29. Additional steam may be added from a line 33 to the vapor-steam line 17, if desired.

For the application of my invention it is not necessary that the fractionator section 12 and the stripper section 25 be separate vessels but they may be combined as one vessel, as illustrated in the embodiment shown in Figure 2. Referring to Figure 2, numeral 40 represents a combined vessel, the upper or fractionator section being represented by numeral 41 and the stripper section by numeral 42. Trays 43 may be essentially any type of trays desired provided they are adapted for use under vacuum conditions. Tray 44 is intended to support a quantity of fractionator kettle product similar to that maintained in the kettle of fractionator 12 of Figure 1. An upflow conduit 45 for steam and styrene vapors is provided, as well as a downflow tube 46 for conducting said liquid kettle bottoms from the kettle into the stripper section without permitting passage of vapors in the reverse direction and yet maintaining a substantial liquid level in said kettle for reboiling purposes. Additional steam may be added to the upper part of the stripper section through a line 46' as shown. These latter members and purposes achieved are conventional in the art.

Fractionator overhead passes from the fractionator 41 by way of vapor line 47, through a cooler or condenser 48, thence into the accumulator 49. Any non-condensible vapors present in the system are removed by a vacuum pump or other ejector 50. Styrene condensate is pumped through a reflux line 51 by a pump 52 into the top of the fractionator for refluxing purposes. Styrene not needed for refluxing passes to product storage, not shown, through a product line 53. Condensate steam or water which settles to the bottom of the accumulator is drawn through a line 54 by a pump 55 and forced through a steam generator 56 and the steam so generated passes into the base of the stripper 42. Condensate water from the stripper may be withdrawn therefrom by a line 57 and passed to waste or it may be readded to the water system as makeup water by a line 58.

Styrene polymer product may be withdrawn from the stripper 42 through a polymer line 59 and passed to a storage, not shown, or otherwise disposed of, as desired.

The general operation of my process when using the apparatus embodiment of Figure 2 is substantially the same as when using the apparatus illustrated in Figure 1.

One new feature of my invention proposes to regulate the extent to which styrene is stripped from polymer by the trays below the feed tray of vessel 12 of Figure 1 or section 41 of Figure 2. The object of this is to concentrate the polymer to such a measure that some smaller portion of the normal overflow below the feed may then be stripped of the polymer to the degree required in the bottoms.

A second new feature takes advantage of the principle of total reflux. In this manner it acts as a complement to the first feature by preventing the need for further separation trays, as would ordinarily be the case. Considering the stripping section of any fractionator, it is shown by a material balance that $$V + W = L$$

Where:

$V$ = quantity of hydrocarbon vapor rising from a tray $L$ = quantity of hydrocarbon liquid falling onto that tray $W$ = quantity of hydrocarbon bottom product Therefore:

$$\frac{L}{V} = \frac{L}{L - W}$$

Two things may be interpreted from this equation. First it is evident that as $W$ becomes smaller and approaches zero, the reflux ratio $$\frac{L}{V}$$

decreases and approaches unity, or total reflux. The second observation is that if $W$ is small by comparison with the liquid and vapor quantities, $L$ and $V$ must be approximately of the same magnitude. Then the $$\frac{L}{V}$$

ratio must be near unity, and the column must be operating in the vicinity of total reflux. This is relevant since in the purification problem herein presented, where the impurities do represent only a small part of the total quantities, the lower section will operate in the vicinity of total reflux even when a relatively small portion of the kettle product from the upper section is to be stripped of styrene. As a consequence, then, of the well-known principle that changes in the reflux ratio of a column operating near total reflux cause little change in separation, it is concluded that the need for additional trays over the number in a conventional type steam distillation column is negligible when the bottom product 27 is a small percentage of the feed 11.

By exploiting these principles certain operating advantages are gained over conventional types of fractionators employed for the same service. For example, with reference to the styrene purification problem outlined herein, it is shown that it would be very undesirable to supply all the necessary heat to the system through a heating element in contact with the bottom product, where the polymer concentration is at a maximum. The hot element would unavoidably cause polymerization on the tubes, thereby decreasing heat transfer rates and necessitating frequent cleaning operations. My invention permits placing the heating element at a point where the concentration of polymer is small, thereby eliminating much of the hazard of fouling the heating element.

A principal advantage of this invention makes possible the use of appreciably less process steam than would otherwise be required. In order to obtain the lowest boiling temperature in the kettle of a column using steam or partial pressure fractionation, it is necessary to saturate with water vapor the vapor in equilibrium with the kettle product, i. e., the partial pressure of the water vapor in the vapor rising from the kettle must be equal to the vapor pressure of pure water at the temperature of the kettle. Obviously, the greater the quantity of hydrocarbon rising from the kettle, the greater becomes the amount of water vapor necessary for saturation. Column material balances show that, in fractionations from which a small kettle product is withdrawn and no reflux is used, the vapor rising from the kettle, the feed stream, and the overhead product are approximately equal. Furthermore, when reflux is required, the vapor rising from the kettle increases as the reflux is increased. Such would be the case here, were this styrene purification to be accomplished by the present conventional types of fractionation. My invention, however, taking advantage of the total reflux principle previously described, proposes to strip styrene from a limited, controlled quantity of the upper section kettle effluent to whatever composition desired in the bottoms. A material balance makes it evident that the vapor rising from and in equilibrium with the bottoms product stream is less for this invention than for the conventional type column, where the liquid to be stripped of styrene amounts roughtly to the sum of the feed plus reflux. Obviously the process steam which would be required to saturate the rising vapor is in direct proportion to the amount of vapor. Moreover, this total vapor, steam plus hydrocarbon, after passing up the bottom section, and being introduced into the base of the upper section has sufficient volume to lower the partial pressure fraction of the hydrocarbon in this upper section to an extent that boiling can take place at a relatively much lower temperature.

The following table furnishes a material and heat balance such as exhibited by the process of my invention. For comparison material and heat balances are also given for a conventional vacuum fractionation process using sufficient steam in the reboiler to produce a styrene polymer of 96% concentration.

For purposes of simplicity I have omitted such auxiliary equipment as valves, regulators, controllers of various kinds, since such are well known and understood by those skilled in such art. Similarly, the positioning of such apparatus has not been indicated.

I do not wish to limit my invention to the apparatus and use thereof disclosed since the example given is merely by way of illustration. For example while reflux is shown at 16 and 51 of Figures 1 and 2 respectively and is necessary in the specific example of styrene separation described, reflux is not a requirement of the broader embodiments of the invention and lines 16 and 51 may be closed (by valves not shown) and vessel 12 may be either a stripper or a fractionator as the separation demands. An as pointed out above in some instances the maintenance of a vacuum on parts 21 and 49 is unnecessary to the broader embodiments of my invention. The principles involved in my process have wide application in many processes requiring low temperature distillation, steam distillation, or vacuum distillation. It will be understood by those skilled in the art that many variations and alterations of the process may be made and yet remain within the intended spirit and scope of my invention as defined by the following claims:

Having described my invention, I claim:

1. A method for separating styrene polymer

|  | Process of Figure 1 | | | | | Conventional Process | | | | | |
| --- | --- | --- | --- | --- | --- | --- | --- | --- | --- | --- | --- |
|  | Mols | | | T. ° F. | (P. s. i. Abs.) Pres. | B. t. u. | Mols | | | T. ° F. | (P. s. i. Abs.) Pres. | B. t. u. |
|  | Styrene | Polymer | Water | | | | Styrene | Polymer | H$_2$O | | | |
| Feed | 36.9 | 2.7 | 0 | | | 291 | 36.9 | 2.7 | 0 | | | 291 |
| Fract. Top | | | | 145 | 2.116 | | | | | 142 | 3.86 | |
| Heat removed from OH vapor by condenser | | | | | | 2,227 | | | | | | 4,193 |
| Steam added | | | 82.7 | | | 1,554 | | | 222 | | | 4,098 |
| Heat added by heater 13 (Figure 1) | | | | | | 606 | | | | | | |
| Product | 36.8 | 0.1 | | 110 | | | 36.8 | 0.1 | | 137 | | |
| Polymer reject | 0.1 | 2.6 | | 137 | | | 0.1 | 2.6 | | 156 | | |
| Max. Temp. in system | | | | 156 | | | | | | 156 | | |

In the above tabulations the B. t. u. given are in thousands, as 291 is actually 291,000.

By the study of the above given comparision data it will be observed that considerably less process steam is required in my process than in the conventional process. The advantage of this steam saving is two-fold inasmuch as the water required for a steam distillation undergoes a vaporizing-condensing cycle. Thus, water must first be vaporized to be used as stripping steam, and then, as part of the overhead effluent, this steam must be totally condensed. It is therefore evident that a reduction of the quantity of water vapor necessary to the distillation is transmitted into a corresponding reduction in the quantities of cooling water and process steam required.

Another important advantage of my process lies in the fact that the heating element (13 of Figure 1, and 60 of Figure 2) may be placed at the bottom of the upper (fractionator) section where the concentration of polymer in the styrene is only about 20 mol percent compared with the 96 mol percent at the base of a conventional fractionator operating on this styrene-polymer service. This minimizes the off-stream cleaning cycles made necessary by polymerization of styrene onto the heating element and the further loss of styrene itself through the excessive polymerization.

from a liquid mixture of styrene and said polymer comprising introducing said mixture as feed into a fractionation zone having a first reboiling zone intermediate the ends thereof and a second reboiling zone at the bottom thereof at a point above said first reboiling zone, maintaining a quantity of said liquid hydrocarbons in said first reboiling zone, adding reboil heat to said quantity of liquid hydrocarbons in said first reboiling zone but maintaining the temperature thereof below the styrene polymerization temperature, passing a quantity of liquid from said first reboiling zone to a point below said first reboiling zone, and passing a mixture of steam and vaporous styrene from the top of said second reboiling zone into said hydrocarbon liquid in said first reboiling zone, maintaining a quantity of liquid styrene polymer and styrene in the bottom of said second fractionation zone as a second product of the said liquid in the bottom of said second reboiling zone to maintain the materials in said second reboiling zone at a temperature just below the first mentioned temperature and withdrawing styrene and steam from the top of said fractionation zone, condensing this withdrawn styrene and steam, separating the condensed styrene into two portions, returning one portion to the top of the fractionation zone as reflux, removing the other portion as a main product of the process and removing styrene polymer from the bottom of said fractionation zone as a second product of the process.

2. A method for separating styrene polymer from a liquid mixture of styrene and said polymer comprising introducing said mixture as feed into a fractionation zone having a first reboiling zone intermediate the ends thereof and a second reboiling zone at the bottom thereof at a point above said first reboiling zone, maintaining a quantity of said liquid hydrocarbons in said first reboiling zone, adding reboil heat to said quantity of liquid hydrocarbons in said first reboiling zone but maintaining the temperature thereof below the styrene polymerization temperature, passing a quantity of liquid from said first reboiling zone to a point below said first reboiling zone, and passing a mixture of steam and vaporous styrene from the top of said second reboiling zone into said hydrocarbon liquid in said first reboiling zone, maintaining a quantity of liquid styrene polymer and styrene in the bottom of said second reboiling zone, introducing sufficient steam into said liquid in the bottom of said second reboiling zone to maintain the materials in said second reboiling zone at a temperature just below the first mentioned temperature and withdrawing styrene and steam from the top of said fractionation zone, condensing this withdrawn styrene and steam, separating the condensed styrene into two portions, returning one portion to the top of the fractionation zone as reflux, removing the other portion as a main product of the process, removing styrene polymer from the bottom of said fractionation zone as a second product of the process wherein the maximum temperature of the process is maintained at 160° F. and the separation is effected at subatmospheric pressure.

3. A method for separating styrene polymer from a liquid mixture of styrene and said polymer comprising introducing said mixture as feed into a fractionation zone having a first reboiling zone intermediate the ends thereof and a second reboiling zone at the bottom thereof at a point above said first reboiling zone, maintaining a quantity of said liquid hydrocarbons in said first reboiling zone, adding reboil heat to said quantity of liquid hydrocarbons in said first reboiling zone but maintaining the temperature thereof below the styrene polymerization temperature, passing a quantity of liquid from said first reboiling zone to a point below said first reboiling zone, and passing a mixture of steam and vaporous styrene from the top of said second reboiling zone into said hydrocarbon liquid in said first reboiling zone, maintaining a quantity of liquid styrene polymer and styrene in the bottom of said second reboiling zone, introducing sufficient steam into said liquid in the bottom of said second reboiling zone to maintain the materials in said second reboiling zone at a temperature just below the first mentioned temperature and withdrawing styrene and steam from the top of said fractionation zone, condensing this withdrawn styrene and steam, separating the condensed styrene into two portions, returning one portion to the top of the fractionation zone as reflux, removing the other portion as a main product of the process, removing styrene polymer from the bottom of said fractionation zone as a second product of the process, wherein the temperature of the liquid hydrocarbons in the first reboiling zone is maintained as the highest temperature in the fractionation zone, and the separation is effected at subatmospheric pressure.

4. A method for separating styrene polymer from a liquid mixture of styrene and said polymer comprising introducing said mixture as feed into a fractionation zone having a first reboiling zone intermediate the ends thereof and a second reboiling zone at the bottom thereof at a point above said first reboiling zone, maintaining a quantity of said liquid hydrocarbons in said first reboiling zone, adding reboil heat to said quantity of liquid hydrocarbons in said first reboiling zone but maintaining the temperature thereof below the styrene polymerization temperature, passing a quantity of liquid from said first reboiling zone to a point below said first reboiling zone, and passing a mixture of steam and vaporous styrene from the top of said second reboiling zone into said hydrocarbon liquid in said first reboiling zone, maintaining a quantity of liquid styrene polymer and styrene in the bottom of said second reboiling zone, introducing sufficient steam into said liquid in the bottom of said second reboiling zone to maintain the materials in said second reboiling zone at a temperature just below the first mentioned temperature and withdrawing styrene and steam from the top of said fractionation zone, condensing this withdrawn styrene and steam, separating the condensed styrene into two portions, returning one portion to the top of the fractionation zone as reflux, removing the other portion as a main product of the process, removing styrene polymer from the bottom of said fractionation zone as a second product of the process, wherein the mixture of styrene and styrene polymer feed contains 7 per cent styrene polymer, sufficient reboil heat is added to said quantity of liquid in said first reboiling zone until the styrene concentration decreases to 80 per cent and sufficient open steam is added to said second reboiling zone to strip styrene from the liquid in this latter zone to produce a styrene polymer of 96 per cent concentration.

5. A method for separating styrene polymer from a liquid mixture of styrene and said polymer comprising introducing said mixture as feed into a fractionation zone having a first reboiling zone intermediate the ends thereof and a second reboiling zone at the bottom thereof at a point above said first reboiling zone, maintaining a quantity of said liquid hydrocarbons in said first reboiling zone, adding reboil heat to said quantity of liquid hydrocarbons in said first reboiling zone but maintaining the temperature thereof below the styrene polymerization temperature, passing a quantiy of liquid from said first reboiling zone to a point below said first reboiling zone, and passing a mixture of steam and vaporous styrene from the top of said second reboiling zone into said hydrocarbon liquid in said first reboiling zone, maintaining a quantity of liquid styrene polymer and styrene in the bottom of said second reboiling zone, introducing sufficient steam into said liquid in the bottom of said second reboiling zone to maintain the materials in said second reboiling zone at a temperature just below the first mentioned temperature and withdrawing styrene and steam from the top of said fractionation zone, condensing this withdrawn styrene and steam, separating the condensed styrene into two portions, returning one portion to the top of the fractionation zone as reflux, removing the other portion as a main product of the process and removing styrene polymer from the bottom of said fractionation zone as a second product of the process, wherein the mixture of styrene and styrene polymer feed contains 7 per cent styrene polymer, sufficient reboil heat is added to said quantity of liquid in said first reboiling zone until the styrene concentration decreases to 80 per cent, sufficient open steam is added to said second reboiling zone to strip styrene from the liquid in this latter zone to produce a styrene polymer of 96 per cent concentration and wherein the separation is carried out under sub-atmospheric pressure and the temperature of the liquid in the second reboiling zone of the fractionation zone is maintained at a lower value by said addition of steam than the temperature of the liquid hydrocarbons in the liquid in said first reboiling zone.

6. A method for separating styrene polymer from a liquid mixture of styrene and said polymer comprising introducing said mixture as feed into a fractionation zone having a first reboiling zone intermediate the ends thereof and a second reboiling zone at the bottom thereof at a point above said first reboiling zone, maintaining a quantity of said liquid hydrocarbons in said first reboiling zone, adding reboil heat to said quantity of liquid hydrocarbons in said first reboiling zone but maintaining the temperature thereof below the styrene polymerization temperature, passing a quantity of liquid from said first reboiling zone to a point below said first reboiling zone, and passing a mixture of steam and vaporous styrene from the top of said second reboiling zone into said hydrocarbon liquid in said first reboiling zone, maintaining a quantity of liquid styrene polymer and styrene in the bottom of said second reboiling zone, introducing sufficient steam into said liquid in the bottom of said second reboiling zone to maintain the materials in said second reboiling zone at a temperature just below the first mentioned temperature and withdrawing styrene and steam from the top of said fractionation zone, condensing this withdrawn styrene and steam, separating the condensed styrene into two portions, returning one portion to the top of the fractionation zone as reflux, removing the other portion as a main product of the process and removing styrene polymer from the bottom of said fractionation zone as a second product of the process, wherein the mixture of styrene and styrene polymer feed contains 7 per cent styrene polymer, sufficient reboil heat is added to said quantity of liquid in said first reboiling zone until the styrene concentration decreases to 80 per cent, sufficient open steam is added to said second reboiling zone to strip styrene from the liquid in this latter zone to produce a styrene polymer of 96 per cent concentration, and wherein the temperature of the hydrocarbon liquid is maintained at a maximum of 160° F., and the temperature of the liquid in the second reboiling zone of the fractionation zone is maintained at 137° F., and the separation is carried out at a pressure of about 2.1 pounds per square inch absolute at the top of the fractionator zone containing the reboil heat addition point.

DOUGLAS S. SHERWIN.

REFERENCES CITED

The following references are of record in the file of this patent:

UNITED STATES PATENTS

| Number | Name | Date |
|---|---|---|
| 1,942,767 | Oman | Jan. 9, 1934 |
| 2,113,130 | Dunham | Apr. 5, 1938 |
| 2,161,798 | Carter | June 13, 1939 |
| 2,196,878 | Stouer | Apr. 9, 1940 |
| 2,224,984 | Potts | Dec. 17, 1940 |
| 2,308,229 | Natta | Jan. 12, 1943 |
| 2,350,584 | Buell | June 6, 1944 |
| 2,362,052 | Craig | Nov. 7, 1944 |
| 2,411,809 | Rupp | Nov. 26, 1946 |
| 2,433,060 | Ohsol | Dec. 23, 1947 |

OTHER REFERENCES

Perry, "Chemical Engineers' Handbook," second edition, published 1941 by McGraw-Hill Book Company, New York, N. Y.